(12) United States Patent
Hetzer

(10) Patent No.: US 6,568,593 B2
(45) Date of Patent: May 27, 2003

(54) SYSTEM AND METHOD FOR IDENTIFICATION OF TOOLS AND PARTS OF TOOLS FOR A FABRICATING MACHINE

(75) Inventor: Uwe Hetzer, Ditzingen (DE)

(73) Assignee: Trumpf GmbH + Co., Ditzingen (DE)

( * ) Notice: Subject to any disclaimer, the term of this patent is extended or adjusted under 35 U.S.C. 154(b) by 162 days.

(21) Appl. No.: 09/906,172

(22) Filed: Jul. 16, 2001

(65) Prior Publication Data

US 2002/0056749 A1 May 16, 2002

(30) Foreign Application Priority Data

Jul. 14, 2000 (EP) .......................................... 00 155 294

(51) Int. Cl.⁷ ................................................ G06K 7/10
(52) U.S. Cl. ................................. 235/385; 235/462.01
(58) Field of Search ................................ 235/383, 385, 235/375, 494, 462.01–462.25, 472.01–472.03, 454, 470

(56) References Cited

U.S. PATENT DOCUMENTS

| 4,072,928 A | * | 2/1978 | Wilder ........................ 382/152 |
| 4,588,339 A | | 5/1986 | Bilz ............................ 409/234 |
| 4,922,591 A | | 5/1990 | Campbell ...................... 29/26 |
| 5,046,014 A | | 9/1991 | Anjo ........................ 364/474.02 |
| 5,786,586 A | * | 7/1998 | Pidhirny et al. ......... 235/472.01 |
| 5,924,738 A | * | 7/1999 | Konkol et al. ................. 283/81 |
| 6,174,579 B1 | * | 1/2001 | Slyster et al. ............... 428/40.1 |
| 6,198,108 B1 | * | 3/2001 | Schweitzer et al. ....... 250/472.1 |
| 6,415,977 B1 | * | 7/2002 | Rumsey ....................... 235/454 |
| 2002/0056749 A1 | * | 5/2002 | Hetzer ......................... 235/454 |

FOREIGN PATENT DOCUMENTS

| EP | 01034629 | 6/1989 |
| EP | 0737541 A1 | 10/1996 |
| WO | WO94/02284 | 2/1994 |

* cited by examiner

Primary Examiner—Thien M. Le

(57) ABSTRACT

A system for identifying tools and/or dies (1, 2, 4) of machine tools and especially of punch presses includes at least one identification marking (6, 7, 8) for each tool and die (1, 2, 4), a scanning device (19) for reading the markings (6, 7, 8), and an evaluation unit for analyzing the scanned data. The markings (6, 7, 8) are removably attached to their associated tools and dies (1, 2, 4) and, when detached, they are accessible to the scanning device (19) for the scanning process. In executing a procedure utilizing the aforementioned system, the markings (6, 7, 8) associated with the tools and dies (1, 2, 4) are detached from these tools and dies (1, 2, 4) and are subsequently scanned. The scanned data can be processed by the machine tool computer to facilitate its efficient operation.

23 Claims, 3 Drawing Sheets

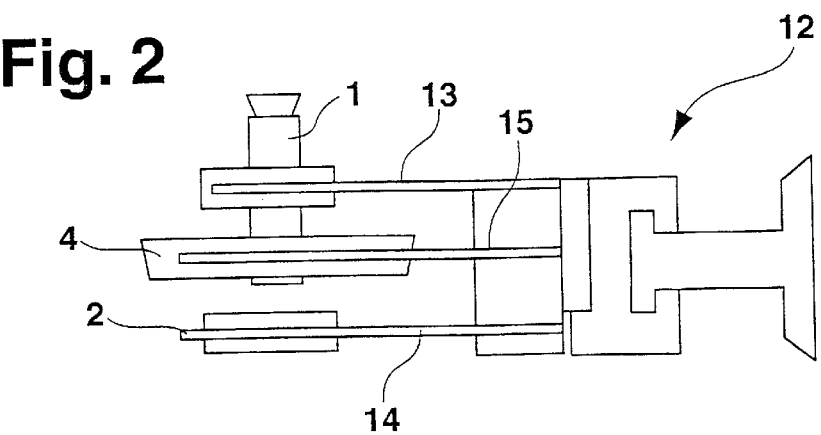
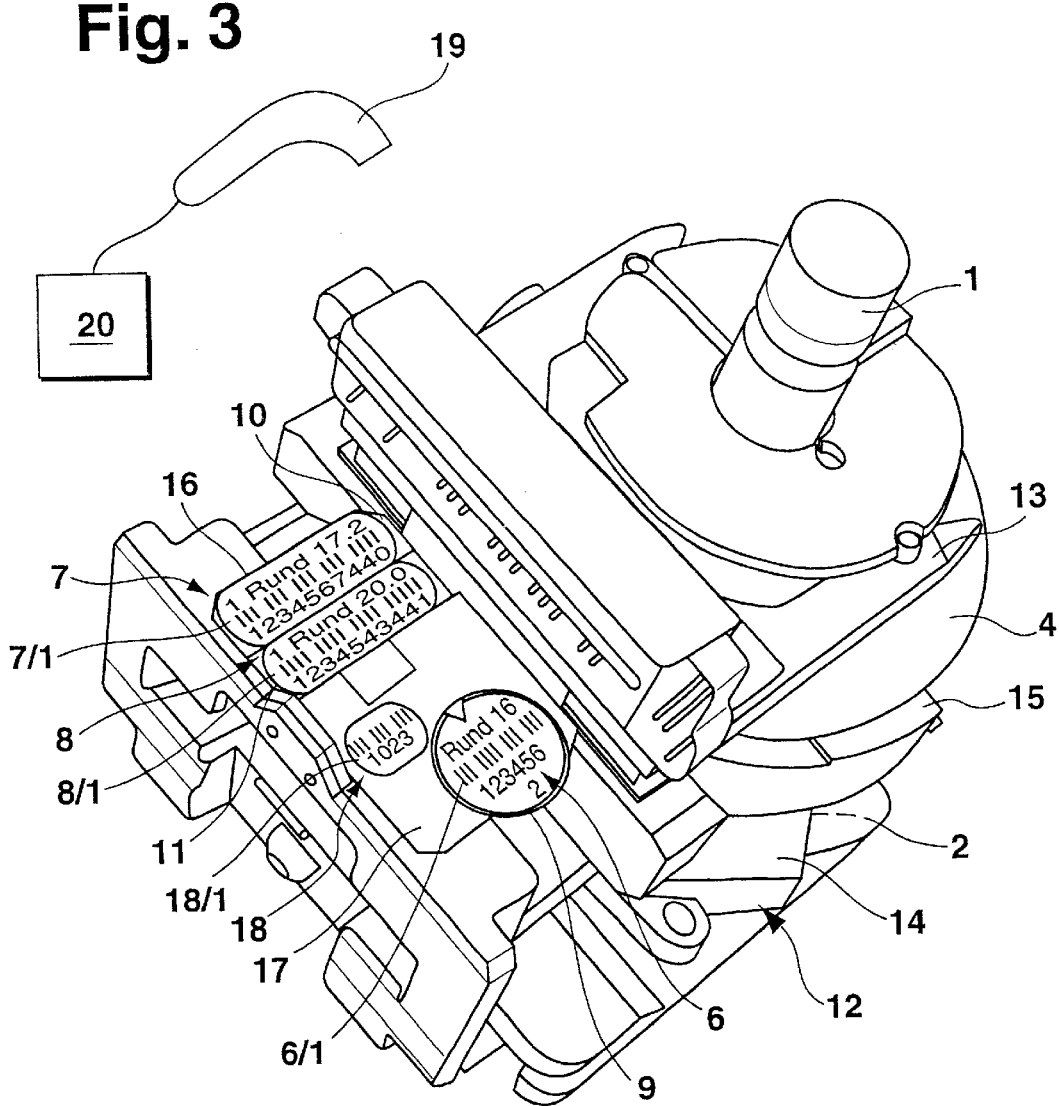

SYSTEM AND METHOD FOR IDENTIFICATION OF TOOLS AND PARTS OF TOOLS FOR A FABRICATING MACHINE

BACKGROUND OF THE INVENTION

This invention relates to a tool and die identification system, and to a procedure employing such a system, for identifying tools and/or dies of machine tools and especially of punch presses.

A system of the general type and a corresponding procedure have been described in U.S. Pat. No. 5,046,014 which is directed to a turret-type punch press in which dies, interchangeably mountable in the tool holder of the punching station, are provided with markings at their upper end in the form of permanent, nonremovable bar codes. In a state of the art system, the bar code is read by a bar code scanner positioned next to the punch press, and serving to scan the bar codes on the dies mounted in the tool holder of the punching station. In the case of dies in a conventional turret-type punch press it is relatively difficult to scan the bar codes due to space constraints within the punching station, apart from necessarily requiring a particular, fixed alignment between the dies in the tool holder of the machine and the position of the bar code scanner.

It is an object of the present invention to provide a novel method for facile identification of tools and dies used in machine tools.

It is also an object to provide a novel assembly of scanning elements and identification elements which is simple and relatively economical.

SUMMARY OF THE INVENTION

It has now been found that the foregoing and related objects may be readily attained in an identification system for identifying and correctly installing the tools and/or dies in machine tools. The system multiple sets of tools and dies each having at least one unique identification marking, a scanning device for scanning the markings, and an evaluation unit for analyzing the identification markings. The markings of the tools and dies are detachably mounted thereon, and, upon detachment from their associated tools and dies, the markings are accessible to the scanning device for the scanning process.

Generally, the markings for the tools and dies are provided by removable labels, and they are attached to their respective tools and dies by a supporting, detachable mounting element in one embodiment. The tools and dies are at least partly magnetic, and the markings of the tools and dies include holding magnets.

In accordance with a preferred embodiment of the present invention, the tools and dies with their associated markings can be positioned in holders, and the markings on the tools and dies can be selectively and removably attached to one of the group consisting of the associated tools, dies, holders, and, when attached to the respective holder or holders, they are accessible to the scanning device for the scanning process.

Multiple holders accommodate individual sets of tools and dies, and a marking is allocated to each such holder and is readable by the scanning device. The evaluation unit functions to correlate the scanned markings on the tools and dies and the scanned markings on the holders.

The markings on the holders represent the spatial location of the latter in a magazine, and the markings of the holders are attached thereto in a removable fashion.

The markings of the tools and dies and/or the markings of the holders are attachable or attached to a defined point on the respective holder. Desirably, the markings of the tools and dies and/or the markings of the holders are attached to the respective holder with a defined orientation.

In one embodiment, the markings of the tools and dies and the markings of the holders are attached to the respective holder at cooperatively configured defined locations and with a defined orientation. These cooperatively configured locations for the placement of the markings of the tools and dies and of the markings of the holders are provided by cooperating inner and outer contours on the respective holder and on the markings If so desired, the tools and dies and/or the respective holders are provided in addition to the markings that can be attached to them in removable fashion, with nonremovable markings with the same information content.

The system provides a method for identifying and correctly installing the tools and dies in a machine tool in which a set of tools is detachably mounted. Multiple sets of tools and dies are provided with at least one unique identification marking. The markings are scanned with a scanning device, and the scanned data is processed in an evaluation unit to analyze the identification markings. The markings on the tools and dies are detachably mounted thereon, and, upon detachment from their associated tools and dies, the markings are accessible to the scanning device for the scanning process. The evaluation device is provided by the computer control system for the machine tool. The computerized control system of the machine tool stores data in the scanned markings of the tools and dies and the scanned markings on associated holders.

The data stored in the computerized control system of the machine tool from the scanned markings on the associated tools and dies and from the scanned markings of the associated holders may be modified.

By providing data in the markings which are useful in varying the operation of the machine tool, the processing step can include the step of controlling the operation of the machine tool (21) as a function of the result of the evaluation of such markings.

As can be readily appreciated, the system of the present invention accomplishes the goals by employing tool and die markings which are detachably mounted on the tools and dies concerned so that these markings, being detachable from their associated tools and dies, can be made readily accessible for scanning.

The features of this invention permit substantially simplified tool and die identification especially in the case of tool components such as punch press dies which, when installed in the processing station, are either not accessible to a scanner or accessible with great difficulty only. The concept of this invention using markings detachable from their respective tools and dies also offers the possibility of keeping the markings at a distance from the processing station during the operation of the machine where otherwise the markings would inevitably be exposed to undesirable effects such as soiling or mechanical wear. Moreover, the invention makes it possible to assign comprehensive markings even to tools and dies which would be too small for holding a fixed identifying label; a case in point would be punch pins. Existing tools and dies can be easily retrofitted with detachable markings per this invention. Accordingly, the system of this invention can just as easily replace existing, less effective tool and die identifying and/or management systems.

Adhesive paper labels can be created by the machine operator and provided with bar codes directly at the job site to adapt to local tool management requirements. In lieu of such paper labels, it is possible to mount on the tools and dies for instance screw-on and/or clip-on markers. Besides bar codes, microchips may be suitable information carriers as well.

The use in this invention of markings equipped with separate mountings offers the advantage of significant flexibility of the entire system in that one and the same mounting can accommodate a combination of interchangeable markings. The mountings are designed in such fashion that they allow the positioning of the markings next to their associated tools and dies while also permitting good access for scanning. Suitable holders include tool cartridges or processing station tool mounts.

The tools and dies can be identified jointly with the holders supporting them. Such a design of the system in this invention is primarily aimed at applications in which a plurality of holders is, or is to be, equipped with interchangeable tools or dies. For the purpose especially of centralized tool management, this permits determination, at any time, of which tool or die is currently mounted in which holder.

The markings may themselves be of different designs. For example, the markings of the tool or die mountings may be contained in spatial alignment inside a magazine. In an automated holder retrieval system, the spatial alignment mentioned may be determined by the movement of a gripper as it retrieves a given holder from the appropriate magazine.

The holder markings are provided on the holders proper. These holder markings are preferably detachable as well. This concept makes it possible in simple fashion to also interchange the holder markings in adaptation to the requirements of the application at hand.

For situations where, perhaps after uncontrolled removal, markings cannot easily be associated with the tools or dies concerned. In addition to the detachable markings with which the tools can be equipped, they can also bear non-detachable markings containing the same information. This feature makes it possible in a case where the markings are in disarray to unambiguously reassociate them with their respective tools and dies and/or holders.

The system of this invention serves not only to identify tools and dies, but it also allows integration into the computerized control circuitry of the associated machine tool. In the operation of the machine tool, such integration offers numerous advantages especially when the data relating to the scanned tools and dies and/or holders are stored in the computerized controller of the machine tool and are even modifiable. For example, when the computerized controller of a punch press stores data on the punches and dies which are interchangeable in the processing station of the machine, including their diameters as well as the diameters of the die openings, the computer control offers the possibility of verifying whether the punch and die combination the operator intends to install in the processing station of the machine tool is in fact compatibly combinable. This ensures correct tool and die selection. The computerized controller can even be programmed in such fashion that the machine will start only if and when the diameter of the identified punch is compatible with that of the identified die.

BRIEF DESCRIPTION OF THE DRAWINGS

FIG. 2 is a schematic side elevational view of a cartridge-type tool holder seating the tools in FIG. 1;

FIG. 3 is a perspective illustration of the tool cartridge with the tools schematically illustrated in FIG. 2, and a bar code reader for use therewith.

DETAILED DESCRIPTION OF THE ILLUSTRATED EMBODIMENT

Figure 1:
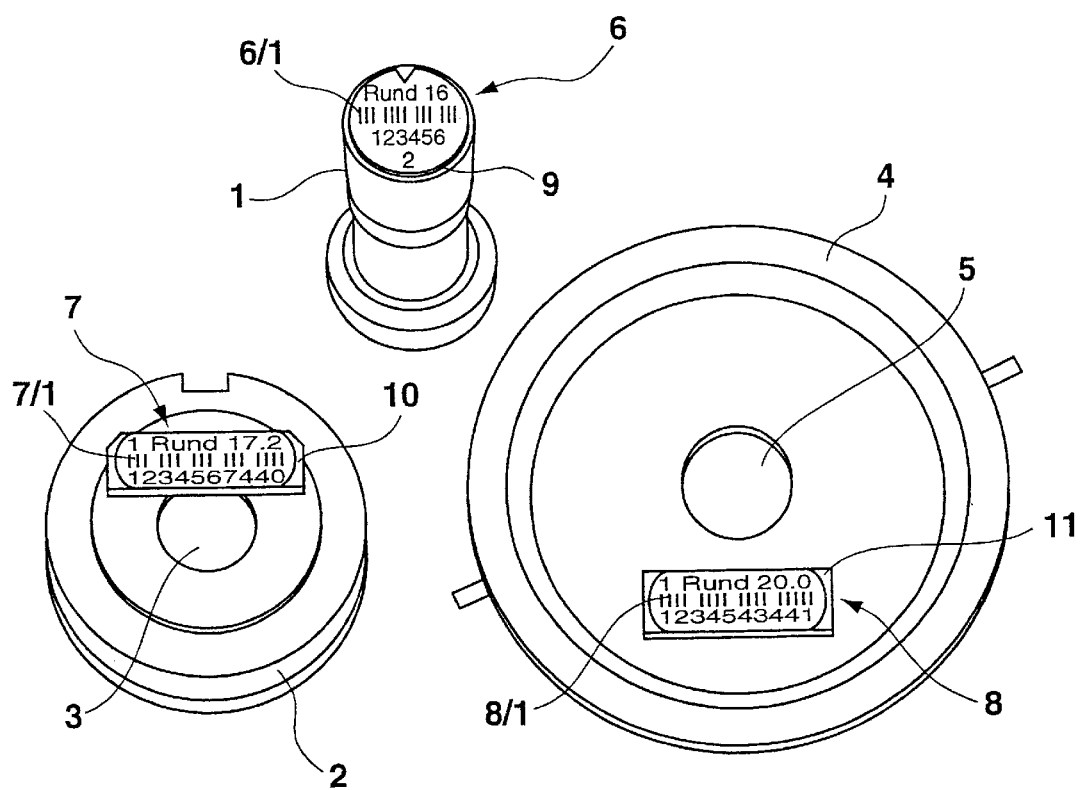
FIG. 1 shows a set of the several tools for a punching tool operation.

As shown in FIG. 1, the components of a conventional punching tool typically include a punch 1, a die 2 with die opening 3, and a stripper 4 with stripper opening 5. The punch 1 is provided with the marking 6, the die with the marking 7, and the stripper with the marking 8.

The markings 6, 7, 8 are in the form of adhesive labels with imprinted bar codes 6/1, 7/1, 8/1 plus nonencoded information. The nonencoded information includes the identifying numbers ("1123456", "1234567440", "1234567441") for the punch 1, the die 2 and the stripper 4; the cross-sectional shape ("round") and the diameter ("16", "17.2", "20.0") of the punch 1, the die opening 3 and the stripper opening 5; as well as the so-called "duplo numbers" ("2", "1", "3"). "Duplo numbers" are assigned to multiple identical dies in which case such identical dies are given consecutive "duplo numbers". For example, FIG. 3 shows the second round punch within the tool set with a diameter of 16 mm. Identical "duplo-numbered" punches may vary in their drag length. The bar codes 6/1, 7/1, 8/1 also contain in encoded form the nonencoded identifying numbers of the individual parts.

The markings 6, 7, 8 are detachably mounted on the punch 1, the die 2 and the stripper 4 by means of holding magnets 9, 10, 11 onto which these markings are adhered. Equipped with the magnetically attached markings 6, 7, 8 the punch 1, the die 2 and the stripper 4 are stored, both before and after the processing of the workpiece, in a tool and die storage magazine such as a tool cabinet (not shown), together with other similarly identified tools and dies. In addition to the detachable markings 6, 7, 8, the punch 1, the die 2 and the stripper 4 are provided with stamped or embossed markings (not illustrated) with the same information content.

In preparation of their deployment, i.e. for setting up the machine tool concerned, the punch 1, the die 2 and the stripper 4, bearing the appropriate markings 6, 7, 8, are retrieved from the tool and die magazine and inserted in a cartridge-type holder 12 as depicted in FIGS. 2 and 3. The basically conventional tool cartridge 12 incorporates support arms 13, 14, 15, which respectively, hold the punch 1, the die 2 and the stripper 4 in place.

Prior to inserting the punch 1, the die 2 and the stripper 4 in the appropriate holders on the support arms 13, 14, 15, the markings 6, 7, 8 are removed from their associated parts and placed in the tool cartridge 12 in the manner indicated in FIG. 3. Matching recesses in the tool cartridge 12 ensure proper, predefined positioning and orientation of the markings 6, 7, 8. Specifically, the inner contour of a recess 16 in the tool cartridge 12 matches the outer contours of the holding magnets 10, 11 of the markings 7, 8 as well as the outer contour of a holding magnet 17 for a marking 18, also in the form of an adhesive label, on the tool cartridge 12. One side of the holding magnet 17 features an inner contour which matches and accepts the holding magnet 9 of the marking 6.

The marking 18 of the tool cartridge 12 includes a bar code 18/1 as well as the nonencoded number "1023". The latter is the storage slot number of the tool cartridge 12 in a tool cartridge magazine. The bar code 18/1 also reflects the same storage slot number in encoded form.

Once the punch 1, the die 2 and the stripper 4 are mounted in the tool cartridge 12 and the markings 6, 7, 8, 18 are placed on the latter in the manner illustrated in FIG. 3, the markings 6, 7, 8, 18, i.e., their individual bar codes 6/1, 7/1, 8/1, 18/1, can be scanned with a manual bar code reader 19. In the same way as the aforementioned markings 6, 7, 8, 18, the bar code reader is an integral part of the system for identifying the punch 1, die 2 and stripper 4. The scanned bar codes contain the identifying numbers of the punch 1, the die 2 and the stripper 4 as well as the number of the storage position of the tool cartridge 12 in a tool cartridge magazine.

The bar code reader 19 is positioned at the setup site and is connected to a computer 20. One purpose served by the computer is the data evaluation on the basis of which the scanned-in markings 6, 7, 8 of the punch 1, die 2 and stripper 4 are assigned to and correlated with the scanned-in marking 18 of the tool cartridge 12. The scanned-in data and the resulting assignment are stored in memory and can be called up on demand. The operator is thus able to determine which tools and dies are mounted in the tool cartridge 12. In analogous fashion it is possible to identify the contents of other tool cartridges, cartridge by cartridge, in the same tool cartridge magazine.

In addition, the computer 20 can access stored information regarding the tools and dies bearing the scanned-in identifying numbers as seen in FIG. 3, for details on the punch 1, the die 2 and the stripper 4. Retrievable relevant data include, inter alia, information which is of critical importance in terms of the combinability, i.e., compatibility of the parts contained in the tool cartridge 12. This includes for instance details on the cross-sectional shape and diameter of the punch 1, of the die opening 3 and of the stripper opening 5. As he or she loads the tool cartridge 12, the operator can also perform a visual inspection with the aid of the nonencoded markings 6, 7, 8. In the event that the check performed by the computer 20 on the parts which the operator intends to load or has already loaded in the tool cartridge reveals that some of the parts are not mutually compatible, the computer 20 will generate an error message on the basis of which the operator can make an appropriate correction to the tool combination.

Figure 4:
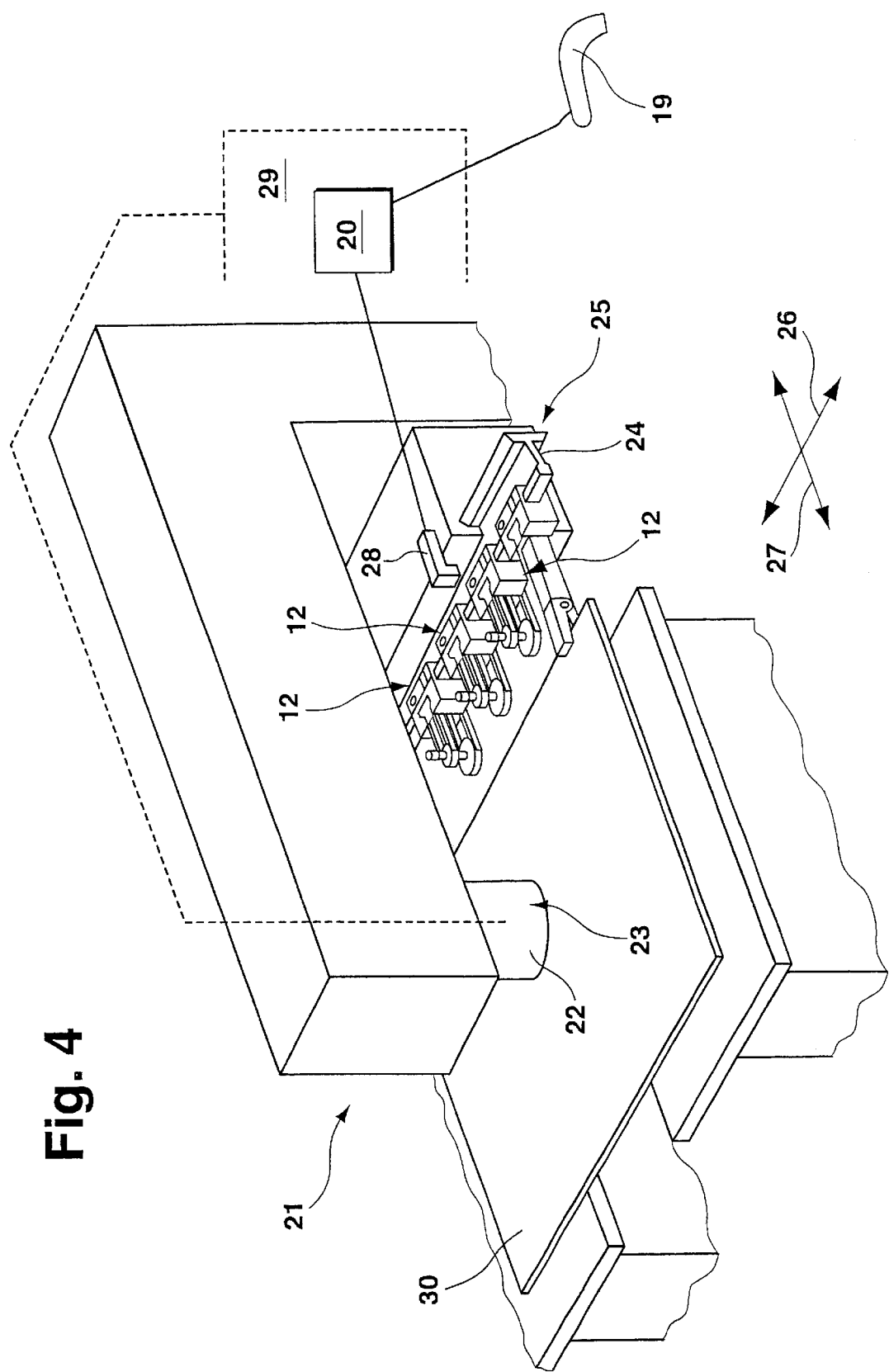
FIG. 4 is a perspective view of a punch press with multiple tool cartridges holding tools of the type illustrated in FIGS. 2 and 3.

In the case of complex workpiece processing operations with a machine tool of a type such as the punch press 21 shown in FIG. 4 used to punch a metal sheet 30, a succession of different punching tools must be employed. As indicated in prior art (for instance in German Patent 3,818,001, these are consecutively exchanged in a specific sequence in the tool holder 22 of the punching station 23 of the punch press 21. The punching tools, in each case including a punch, a die and a stripper, are kept in the vicinity of the punching station 23 in tool cartridges similar to the tool cartridge 12 shown in FIGS. 2 and 3. After having been equipped with punch, die and stripper as described above and marked with the markings of the tools and dies concerned in addition to their own markings, the tool cartridges 12 are loaded by the operator in a so-called "linear magazine" mounted on a track 24 of the X-Y coordinate guide system 25 of the punch press 21. In conventional fashion, the track 24 with the supported tool cartridges 12 is movable along a horizontal plane in the direction indicated by the double arrows 26, 27. By means of an appropriate displacement of the track 24 or of the X-Y guidance system 25, the punching tools contained in the individual tool cartridges 12 on a tool holder 22 of the punching station 23 are automatically inserted and interchanged.

After the linear magazine with the loaded tool cartridges 12 is set up on the track 24, the markings of the tools and dies placed on the tool cartridge and that of the tool cartridge 12 itself are scanned by means of a scanning device such as a bar code reader 28. This is accomplished by moving the track 24 with the tool cartridges 12 of the linear magazine, bearing the markings, past the stationary bar code reader 28. The latter, like the bar code reader 19, is connected to the computer 20 and is an integral part of the tool and die identification system of the punch press 21. As an alternative to the configuration described, the bar code reader 28 could be mounted on a stand separate from the punch press 21 which would isolate it from such negative influences as vibrations which are generated during the processing of the workpiece. It is also possible to move the bar code reader 28 past the tool cartridges 12, i.e. past the markings attached to them, in the direction of the double arrow 26. That movement could be executed either manually or automatically.

When in the setup process of the tool cartridges 12 the markings of the tools and dies and of the tool cartridges 12 themselves in which they are mounted are positioned and aligned in the appropriate predefined fashion, the bar code reader 28 can easily scan the markings of these tools and dies. The same applies to the appropriately positioned and oriented markings of the tool cartridges 12. The markings of the tools and dies and of the tool cartridges 12, scanned in with the bar code reader, are again mutually correlated with the aid of the computer 20. The markings scanned in by means of the bar code reader 28 also permit the determination of which tools and dies are contained in which tool cartridges 12 and/or whether the tools and dies mounted in any one particular tool cartridge 12 are mutually compatible. If the storage slots of the individual tool cartridges 12 in the linear magazine on the track 24 have also been defined, it will also be possible to determine which tools and dies are located in which storage slot of the linear magazine.

The computer 20 and the above-described individual components of the system for identifying tools and dies are constituent elements of a computerized controller system 29 of the punch press 21. Accordingly, the markings scanned in by means of the bar code reader 19 and/or the bar code reader 28 can be utilized for controlling the punch press 21. If for instance the computer 20 determines that one of the tool cartridges on the track 24 contains tools or dies which are not mutually compatible and whose joint use would lead to a breakdown of the punching process, a control signal may be generated on the basis of which the as yet uninitialized drive of the punch press 21 is locked in the nonoperational state. It is also possible on the basis of the markings scanned in by the bar code reader 19 and/or the bar code reader 28 to set operating parameters for the punch press 21. For example, if the computer 20 has access to information on the drag lengths of the punches contained in the individual tool cartridges 12, the punch markings scanned in by the bar code reader 19 and/or 28 allow the computer 20 to initially assign the drag lengths of the respective punches. On the basis of these drag lengths, it is then possible to determine the length of the strokes which the tool holder 22 in the punch station 23 of the punch press 21 must travel in order for the individual punches to penetrate into the corresponding dies for producing the desired cut-outs at the required depth. The movement of the tool holder 22 driven by the punch press 21 is then controlled as a function of the computer-calculated punch penetration depths or punch strokes. The data available to the computer 20 on the tools and dies and on the tool cartridge 12 are modifiable and thus, most important, updatable.

Since the storage slots of the tool cartridges 12 in the linear magazine on the track 24 are defined and the content of these storage slots has been detected by the bar code reader 28, it is now known which tools and dies are located at which point in the linear magazine. Based on the information acquired by the bar code reader 19 or the bar code reader 28 and analyzed by the computer 20, it is possible to define the movement of the X-Y coordinate guidance system 25 or of the track 24 that must be executed in order to feed to the tool holder 22 of the punch press 21 the individual punching tools in the sequence necessary for achieving the desired processing results. The computerized controller 29 then activates and guides the drive unit of the X-Y guidance system 25 accordingly. In setting up the linear magazine on the track 24, the loaded tool cartridges 12 may be placed in any order in the available, defined storage slots.

Having thus described the invention, what is claimed is:

1. An identification system for identifying and correctly installing the tools and/or dies (1, 2, 4) in machine tools comprising multiple sets of tools and dies each having at least one unique identification marking (6, 7, 8); a scanning device (19, 28) for scanning the markings (6, 7, 8), and an evaluation unit for analyzing the identification markings (6, 7, 8) each of said markings (6, 7, 8) for the tools and dies (1, 2, 4) being detachably mounted thereon, and, upon detachment from their associated tools and dies (1, 2, 4), the markings (6, 7, 8) are accessible to the scanning device (19, 28) for the scanning process.

2. The identification system in accordance with claim 1, wherein said markings (6, 7, 8) for the tools and dies (1, 2, 4) are removable labels.

3. The identification system in accordance with claim 1, wherein the markings (6, 7, 8) for the tools and dies (1, 2, 4) are attached to their respective tools and dies (1, 2, 4) by a supporting, detachable mounting element.

4. The identification system in accordance with claim 1 wherein said tools and dies (1, 2, 4) are at least partly magnetic, and wherein said markings (6, 7, 8) for the tools and dies (1, 2, 4) include holding magnets (9, 10, 11).

5. The identification system in accordance with claim 1 wherein the tools and dies (1, 2, 4) with the associated markings (6, 7, 8) can be positioned in a holder (12), and wherein said markings (6, 7, 8) for the tools and dies (1, 2, 4) can be selectively and removably attached to one of the group consisting of the associated tools and dies (1, 2, 4) and assigned holders (12), and, when attached to the respective holder (12), they are accessible to said scanning device (19, 28) for the scanning process.

6. The identification system in accordance with claim 5 wherein there are multiple holders (12), each of which accommodates tools and dies (1, 2, 4), and wherein a marking (18) is allocated to each such holder and is readable by said scanning device (19, 28), said evaluation unit (20) being functional to correlate the scanned markings (6, 7, 8) of the tools and dies (1, 2, 4) and the scanned markings (18) for the holders (12).

7. The identification system in accordance with claim 6 wherein the markings of the holders (12) include the spatial location of the latter in a magazine.

8. The identification system in accordance with claim 5 wherein the markings (18) for the holders (12) are attached to the latter.

9. The identification system in accordance with claim 5, wherein the markings (18) for the holders (12) are removably attached thereto.

10. The identification system in accordance with claim 5 wherein the markings (6, 7, 8) for the tools and dies (1, 2, 4) and/or the markings (18) for the holders (12) are attachable or attached at a defined point on the respective holder (12).

11. The identification system in accordance with claim 5 wherein the markings (6, 7, 8) for the tools and dies (1, 2, 4) and/or the markings (18) for the holders (12) are attached to the respective holder (12) in a defined orientation.

12. The identification system in accordance with claim 5 wherein the markings (6, 7, 8) on the tools and dies (1, 2, 4) and the markings (18) for the holders (12) are attached to the respective holder (12) at form-fitting junctions in a defined location and/or in a defined orientation.

13. The identification system in accordance with claim 12 wherein the form-fitting junctions for the placement of the markings (6, 7, 8) for the tools and dies (1, 2, 4) and of the markings (18) for (12) are provided by cooperating inner and outer contours on the respective holder (12) and on the markings (6, 7, 8, 18).

14. The identification system in accordance with claim 5 wherein that markings (18) for the holders (12) correspond to the markings (6, 7, 8) for the tools and dies (1, 2, 4).

15. The identification system in accordance with claim 5 wherein the tools and dies (1, 2, 4) and/or the respective holders (12) are provided, in addition to the markings (6, 7, 8, 18) that can be attached to them in removable fashion, with nonremovable markings with the same information content.

16. The identification system in accordance with claim 5 wherein the scanning device (19, 28) serving to read the markings (6, 7, 8) on the tools and dies (1, 2, 4) is also employed as the scanning device (19, 28) serving to read the markings (18) on the holders (12).

17. A method for identifying and correctly installing the tools and dies (1, 2, 4) in a machine tool comprising; (a) providing a machine tool in which a set of tools is detachably mounted; (b) providing multiple sets of tools and dies with at least one unique identification marking (6, 7, 8) (1, 2, 4); (c) scanning the markings (6, 7, 8) with a scanning device, and (d) processing the scanned data in an evaluation unit to analyze the identification markings, said markings (6, 7, 8) for the tools and dies (1, 2, 4) being detachably mounted thereon, and, upon detachment from their associated tools and dies (1, 2, 4), the markings (6, 7, 8) are accessible to the scanning device (19, 28) for the scanning process, said evaluation device being provided by the computer control system for the machine tool.

18. The method for identifying and correctly installing tools and dies in a machine tool in accordance with claim 17 including the step of storing data on the scanned markings (6, 7, 8) for the tools and dies (1, 2, 4) and the scanned markings (18) of the associated holders (12) in the computerized control system (29) of the machine tool (21).

19. The method for identifying and correctly installing tools and dies in a machine tool in accordance with claim 18 including the step of modifying the data stored in the computerized control system (29) of the machine tool (21) from the scanned markings (6, 7, 8) of the associated tools and dies (1, 2, 4) and from the scanned markings (18) of the associated holders (12).

20. The method for identifying and correctly installing tools and dies in a machine tool in accordance with claim 17 including the steps of removing the markings (6, 7, 8) associated with the tools and dies (1, 2, 4) from the tools and dies (1, 2, 4), and subsequently scanning such markings.

21. The method for identifying and correctly installing tools and dies in a machine tool in accordance with claim 20 including the steps of placing in holders (12) multiple sets of tools and dies (1, 2, 4) with associated markings (6, 7, 8), removing the markings (6, 7, 8) from their respective tools and dies (1, 2, 4) and attaching them to the holders (12) in which the tools and dies (1, 2, 4) are contained, and scanning the markings (6, 7, 8) of the tools and dies (1, 2, 4) on the respective holders (12).

22. The method for identifying and correctly installing tools and dies in a machine tool in accordance with claim 21 wherein each of said holders (12) is assigned its own identification marking (18), and wherein, in addition to the scanning of the markings (6, 7, 8) of the tools and dies (1, 2, 4), the markings (18) of the holders (12) are scanned, and wherein the scanned markings (6, 7, 8) of the tools and dies (1, 2, 4) and the scanned markings (18) of the holders (12) are mutually correlated.

23. The method for identifying and correctly installing tools and dies in a machine tool in accordance with claim 21 including the step of controlling the operation of the machine tool (21) as a result of the evaluation of such markings.

* * * * *